United States Patent
Nelson et al.

(10) Patent No.: US 9,560,185 B2
(45) Date of Patent: Jan. 31, 2017

(54) HYBRID TELECOMMUNICATIONS NETWORK CONNECTION INDICATOR

(71) Applicant: MICROSOFT TECHNOLOGY LICENSING, LLC, Redmond, WA (US)

(72) Inventors: Jason Nelson, Redmond, WA (US); Jeffrey C. Fong, Seattle, WA (US); Aaron Woodman, Seattle, WA (US); Christopher Raykovich, Seattle, WA (US); Jon Arnett, Seattle, WA (US); Eric Hull, Seattle, WA (US); Gregory Howard, Kirkland, WA (US); John Skovron, Bellevue, WA (US); Stephen Speicher, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 233 days.

(21) Appl. No.: 14/220,071

(22) Filed: Mar. 19, 2014

(65) Prior Publication Data

US 2015/0271317 A1    Sep. 24, 2015

(51) Int. Cl.
*G06F 3/0481* (2013.01)
*H04M 1/725* (2006.01)
*H04B 17/318* (2015.01)

(52) U.S. Cl.
CPC ...... *H04M 1/72563* (2013.01); *G06F 3/04817* (2013.01); *H04M 1/72519* (2013.01);
(Continued)

(58) Field of Classification Search
CPC .................................................. G06F 3/04817
(Continued)

(56) References Cited

U.S. PATENT DOCUMENTS 6,148,206 A    11/2000   Karanja et al.
6,335,927 B1   1/2002    Elliott et al.
(Continued)

FOREIGN PATENT DOCUMENTS

CN    101656922 A    2/2010
EP    1432219 A1     6/2004
(Continued)

OTHER PUBLICATIONS

Ryan Whitman, "A Google Engineer Explains Why KitKat Has White Status Bar Icons and Only Shows Connectivity in Quick Settings", available at <http://www.androidpolice.com/2013/11/18/a-google-engineer-explains-why-kitkat-has-white-status-bar-icons-and-only-shows-connectivity-in-quick-settings/>, availabe on Nov. 18, 2013, 3 pages.*

(Continued)

*Primary Examiner* — Reza Nabi
*Assistant Examiner* — Daniel Rodriguez
(74) *Attorney, Agent, or Firm* — Miia Sula; Judy Yee; Micky Minhas

(57) ABSTRACT

A mobile device having capabilities to access connections to cellular and Wi-Fi portions of a hybrid telecommunications network is configured to display a variety of different icons that graphically indicate a current connection status for both data usage and voice calling on a graphical user interface (GUI). A user can put the GUI into an expanded state to show additional information about the connection status including textual descriptions of icons to instruct the user as to the specific meaning of a given icon. The textual descriptions enable an association between the iconography and the connection state to be established for the user. The icons can then quickly and effectively convey connection state to the user in a comprehensive manner while efficiently using the available display space on the device.

3 Claims, 12 Drawing Sheets

(52) U.S. Cl.
CPC ....... *H04B 17/318* (2015.01); *H04M 2250/06* (2013.01); *H04M 2250/22* (2013.01); *H04M 2250/56* (2013.01)

(58) Field of Classification Search
USPC ........................................................ 715/753
See application file for complete search history.

(56) References Cited

U.S. PATENT DOCUMENTS

| | | |
|---|---|---|
| 6,343,220 B1 | 1/2002 | Van Der Salm |
| 6,490,449 B1 | 12/2002 | Thibert et al. |
| 6,518,957 B1 | 2/2003 | Lehtinen |
| 6,763,226 B1 | 7/2004 | McZeal, Jr. |
| 7,010,002 B2 | 3/2006 | Chow et al. |
| 7,110,750 B2 | 9/2006 | Oishi et al. |
| 7,411,911 B2 | 8/2008 | Huotari et al. |
| 7,483,984 B1 | 1/2009 | Jonker et al. |
| 7,631,270 B2 | 12/2009 | Cunningham et al. |
| 7,697,479 B2 | 4/2010 | Metke et al. |
| 7,706,291 B2 | 4/2010 | Luft et al. |
| 7,746,989 B2 | 6/2010 | Mazor |
| 7,796,998 B1 | 9/2010 | Zellner et al. |
| 7,830,863 B2 | 11/2010 | Biage et al. |
| 7,835,751 B2 | 11/2010 | Ibe |
| 7,894,807 B1 | 2/2011 | Drennan |
| 7,903,794 B1 | 3/2011 | Bales et al. |
| 7,986,943 B2 | 7/2011 | Bumiller |
| 7,995,565 B2 | 8/2011 | Buckley et al. |
| 8,000,710 B2 | 8/2011 | Jagadeesan et al. |
| 8,032,122 B2 | 10/2011 | Sigmund et al. |
| 8,126,465 B2 | 2/2012 | Lu et al. |
| 8,155,084 B2 | 4/2012 | Long et al. |
| 8,254,986 B2 | 8/2012 | Russell |
| 8,670,405 B1 | 3/2014 | Lee |
| 8,976,950 B2 | 3/2015 | Kramarenko |
| 9,001,787 B1 | 4/2015 | Conant |
| 9,408,077 B1* | 8/2016 | David .................... H04W 4/14 |
| 2002/0059453 A1 | 5/2002 | Eriksson et al. |
| 2002/0146000 A1 | 10/2002 | Jonsson et al. |
| 2003/0231759 A1 | 12/2003 | Bedingfield, Sr. et al. |
| 2004/0047339 A1 | 3/2004 | Wang et al. |
| 2004/0121761 A1 | 6/2004 | Tripathy et al. |
| 2004/0203607 A1 | 10/2004 | Satapathy |
| 2004/0240430 A1 | 12/2004 | Lin et al. |
| 2005/0070291 A1 | 3/2005 | Shi |
| 2005/0186960 A1 | 8/2005 | Jiang |
| 2005/0249196 A1 | 11/2005 | Ansari et al. |
| 2005/0286466 A1 | 12/2005 | Tagg et al. |
| 2006/0029049 A1 | 2/2006 | Kobayashi et al. |
| 2006/0030357 A1 | 2/2006 | McConnell et al. |
| 2006/0045069 A1 | 3/2006 | Zehavi et al. |
| 2006/0121902 A1 | 6/2006 | Jagadeesan et al. |
| 2006/0133582 A1 | 6/2006 | McCulloch |
| 2006/0187900 A1 | 8/2006 | Akbar |
| 2006/0198360 A1 | 9/2006 | Biage et al. |
| 2006/0245413 A1 | 11/2006 | Skalecki et al. |
| 2007/0067734 A1* | 3/2007 | Cunningham ...... G06F 3/04817 715/779 |
| 2007/0070948 A1 | 3/2007 | Kezys et al. |
| 2007/0081518 A1 | 4/2007 | Jain et al. |
| 2007/0083918 A1 | 4/2007 | Pearce |
| 2007/0086584 A1 | 4/2007 | Rossini |
| 2007/0197224 A1 | 8/2007 | Winkler |
| 2007/0206568 A1 | 9/2007 | Silver |
| 2007/0206571 A1 | 9/2007 | Silver |
| 2007/0217366 A1 | 9/2007 | Sagi et al. |
| 2007/0263613 A1 | 11/2007 | Hara et al. |
| 2008/0026732 A1 | 1/2008 | Goldfarb |
| 2008/0032695 A1 | 2/2008 | Zhu et al. |
| 2008/0056235 A1 | 3/2008 | Albina et al. |
| 2008/0096560 A1 | 4/2008 | Felske et al. |
| 2008/0102815 A1 | 5/2008 | Sengupta et al. |
| 2008/0113683 A1* | 5/2008 | Paas .................. H04M 1/72519 455/552.1 |
| 2008/0123625 A1 | 5/2008 | Buckley |
| 2008/0192900 A1 | 8/2008 | Liu |
| 2008/0232352 A1 | 9/2008 | Terrill et al. |
| 2008/0242299 A1* | 10/2008 | Edwards ............... H04W 48/08 455/435.2 |
| 2008/0254797 A1 | 10/2008 | Achtari et al. |
| 2008/0261603 A1 | 10/2008 | Sever |
| 2008/0279176 A1 | 11/2008 | Cheng |
| 2009/0003316 A1 | 1/2009 | Lee |
| 2009/0086937 A1 | 4/2009 | Horn et al. |
| 2009/0097450 A1 | 4/2009 | Wallis et al. |
| 2009/0141682 A1 | 6/2009 | Zou et al. |
| 2009/0191876 A1 | 7/2009 | Jain et al. |
| 2009/0233602 A1 | 9/2009 | Hughes |
| 2009/0249247 A1* | 10/2009 | Tseng ................ H04M 1/72552 715/808 |
| 2009/0285175 A1 | 11/2009 | Nix |
| 2009/0305732 A1 | 12/2009 | Marcellino |
| 2010/0080128 A1 | 4/2010 | Hovey et al. |
| 2010/0124897 A1 | 5/2010 | Edge |
| 2010/0172323 A1 | 7/2010 | Rexhepi et al. |
| 2010/0172483 A1 | 7/2010 | Weiner |
| 2010/0226339 A1 | 9/2010 | Stephenson et al. |
| 2010/0246785 A1 | 9/2010 | Wang |
| 2010/0285785 A1* | 11/2010 | Wang ................. H04M 1/72583 455/418 |
| 2010/0304724 A1 | 12/2010 | Lawler |
| 2010/0316199 A1 | 12/2010 | Martin, II |
| 2011/0044293 A1 | 2/2011 | Nagasawa |
| 2011/0103576 A1 | 5/2011 | Partington et al. |
| 2012/0014273 A1 | 1/2012 | Notton et al. |
| 2012/0115490 A1 | 5/2012 | Nicholson |
| 2012/0120914 A1 | 5/2012 | Sedlacek et al. |
| 2012/0140743 A1 | 6/2012 | Pelletier |
| 2012/0196644 A1 | 8/2012 | Scherzer et al. |
| 2012/0236868 A1 | 9/2012 | Yan |
| 2012/0282942 A1 | 11/2012 | Uusitalo |
| 2012/0296963 A1 | 11/2012 | Lu |
| 2012/0302223 A1* | 11/2012 | Austin .................... H04W 8/18 455/418 |
| 2013/0007286 A1 | 1/2013 | Mehta et al. |
| 2013/0035138 A1* | 2/2013 | Abbott .................. H04L 67/36 455/566 |
| 2013/0064106 A1 | 3/2013 | Sylvain |
| 2013/0067056 A1 | 3/2013 | Purkayastha et al. |
| 2013/0100887 A1 | 4/2013 | Kim |
| 2013/0196653 A1 | 8/2013 | Morrison |
| 2013/0196706 A1 | 8/2013 | Patel et al. |
| 2013/0331101 A1 | 12/2013 | Thomas et al. |
| 2014/0068314 A1* | 3/2014 | Kim ...................... G06F 1/3212 713/340 |
| 2014/0070991 A1 | 3/2014 | Liu |
| 2014/0171084 A1* | 6/2014 | Chandler .......... H04W 36/0066 455/436 |
| 2014/0229888 A1* | 8/2014 | Ko ...................... G06F 3/04886 715/783 |
| 2014/0254491 A1 | 9/2014 | Lindholm |
| 2014/0269495 A1 | 9/2014 | Frantz |
| 2014/0365945 A1* | 12/2014 | Karunamuni ......... G06F 3/0485 715/773 |
| 2015/0031417 A1* | 1/2015 | Lee .................. H04M 1/72519 455/566 |
| 2015/0038156 A1 | 2/2015 | Kilpatrick, II |
| 2015/0052466 A1* | 2/2015 | Chun .................... G06F 3/0486 715/769 |
| 2015/0065134 A1 | 3/2015 | Vandemoere et al. |
| 2015/0094120 A1* | 4/2015 | Suh .................... G06F 3/04883 455/566 |
| 2015/0127839 A1* | 5/2015 | Shipley ................ H04W 76/04 709/228 |

FOREIGN PATENT DOCUMENTS

| | | |
|---|---|---|
| EP | 1519526 A1 | 3/2005 |
| EP | 1858270 A1 | 11/2007 |
| EP | 2009887 A1 | 12/2008 |
| EP | 2096843 A2 | 9/2009 |
| EP | 2112849 A2 | 10/2009 |

(56) References Cited

FOREIGN PATENT DOCUMENTS

| | | |
|---|---|---|
| EP | 2271171 A1 | 1/2011 |
| JP | 2002-262336 A | 9/2002 |
| WO | 0013454 A1 | 3/2000 |
| WO | 02/11475 A1 | 2/2002 |
| WO | 2004/057845 A1 | 7/2004 |
| WO | 2005055626 A1 | 6/2005 |
| WO | 2005101785 A1 | 10/2005 |
| WO | 2008110664 A1 | 9/2008 |
| WO | 2009040645 A1 | 4/2009 |
| WO | 2013025698 A1 | 2/2013 |

OTHER PUBLICATIONS

Corey Gunther, "What's this icon? Galaxy S4 notification bar icons explained", available on Jul. 9, 2013, available at <http://androidcommunity.com/whats-this-icon-galaxy-s4-notification-bar-icons-explained-20130709/>, 3 pages.*
designyourway.com, "User Interface Design Inspiration—45 Lovely Switches", avaible at <http://www.designyourway.net/drb/user-interface-design-inspiration-45-lovely-switches>, archived on Jul. 20, 2013 at wayback machine <http://web.archive.org>, 16 pages.*
"International Search Report and Written Opinion Issued in PCT Application No. PCT/US2015/39310", Mailed Date: Oct. 14, 2015, (10 Pages total).
Bellavista, et al., "An IMS Vertical Handoff Solution to Dynamically Adapt Mobile Mulitmedia Services", IEEE Symposium on Computers and Communications, Jul. 6, 2008, pp. 764-771, 8 pages.
Achour et al., "Inter-Domain Mobility Management Solution for Service Continuity in IMS-Based Networks", IEEE Consumer Communications and Networking Conference, Jan. 14, 2012, pp. 559-564, 6 pages.
Whitwam, Ryan, "Republic Wireless Moto X Review: A Great Deal with Very Few Compromises", Published on: Dec. 4, 2013, Available at: http://www.androidpolice.com/2013/12/03/republic-wireless-moto-x-review-a-great-deal-with-very-few-compromises/ (12 pages total).
Perenson, Melissa, "Republic Wireless: Everything You Need to Know", Published on: Aug. 28, 2013, Available at: http://blog.laptopmag.com/republic-wireless-faq (6 pages total).
"ip4calls-iTelHybridDialer", Published on: Jul. 17, 2013, Available at: https://play.google.com/store/apps/details?id=com.revesoft.hybriddialer.first_united_international_general_trading_ip4calls&hl=en (2 pages total).
Whitwam, Ryan, "A Google Engineer Explains Why KitKat has White Status Bar Icons and Only Shows Connectivity in Quick Settings", Published on: Nov. 18, 2013, Available at: http://www.androidpolice.com/2013/11/18/a-google-engineer-explains-why-kitkat-has-white-status-bar-icons-and-only-shows-connectivity-in-quick-settings/ (9 pages total).
Ormond, et al., "Dynamic Network Selection in Wireless LAN/MAN Heterogeneous Networks", In Proceedings of Mobile WiMAX: Towards Broadband Wireless Metropolitan Area Networks, Dec. 10, 2007, (60 pages total).
Alkhwlani, et al., "Access Network Selection using Combined Fuzzy Control and MCDM in Heterogeneous Networks", In Proceedings of International Conference on Computer Engineering & Systems, Nov. 27, 2007, (6 pages total).
Porjazoski, et al., "Radio Access Technology Selection in Heterogeneous Wireless Networks Based on Service Type and User Mobility", In Proceedings of 18th International Conference on Systems, Signals and Image Processing, Jun. 16, 2011, (4 pages total).
Adamopoulou, et al., "Intelligent Access Network Selection in Heterogeneous Networks", In 2nd International Symposium on Wireless Communication Systems, Sep. 7, 2005, (5 pages total).
Alkhawlani, et al., "Hybrid Approach for Radio Network Selection in Heterogeneous Wireless Networks", In International Journal of Advanced Science and Technology, vol. 44, Jul. 2012, (16 pages total).
Cai, et al., "Dynamic and User-Centric Network Selection in Heterogeneous Networks", In Proceedings of IEEE International Performance, Computing, and Communications Conference, Apr. 11, 2007, (7 pages total).
Gharsellaoui, et al., "Optimizing Access Point Selection in Wireless Local Area Networks", In Proceedings of International Conference on Communications and Information Technology, Mar. 29, 2011, (6 pages total).
Jafry, et al., "Call Handoff Initiation in Hybrid Networks", U.S. Appl. No. 14/144,668, filed Dec. 31, 2013.
Calhan, et al., "An Adaptive Neuro-Fuzzy Based Vertical Handoff Decision Algorithm for Wireless Heterogeneous Networks", In IEEE 21st International Symposium Personal Indoor and Mobile Radio Communications, Sep. 26, 2010, (6 pages total).
Yan, et al., "A Survey of Vertical Handover Decision Algorithms in Fourth Generation Heterogeneous Wireless Networks", In Computer Networks: The International Journal of Computer and Telecommunications Networking, vol. 54, Issue 11, Aug. 2010, (16 pages total).
Liu, et al., "Performance Analysis and Optimization of Handoff Algorithms in Heterogeneous Wireless Networks", In IEEE Transactions on Mobile Computing, vol. 7, Issue 7, Jul. 2008, (12 pages total).
Wong, et al., "A Pattern Recognition System for Handoff Algorithms", In IEEE Journal on Selected Areas in Communications, vol. 18, Issue 7, Jul. 2000, (12 pages total).
Sidhu, et al., "Call Continuity", U.S. Appl. No. 14/026,933, filed Sep. 13, 2013.
Kalmanek, et al., "A Network-Based Architecture for Seamless Mobility Services", In IEEE Communications Magazine, vol. 44, Issue 6, Jun. 2006 (7 pages total).
Salkintzis, et al., "Voice Call Handover Mechanisms in Next-Generation 3GPP Systems", In IEEE Communications Magazine, vol. 47, Issue 2, pp. 46-56, Feb. 2009 (11 pages total).
Voice Call Flow Overview, 2007 Cisco Systems, Inc., pp. 1-14, Retrieved from: http://www.cisco.com/en/US/docs/ios/voice/monitor/configuration/guide/vt_callflow_ov.pdf, Retrieved on: Jun. 17, 2013 (14 pages total).
J. Rosenberg, "Interactive Connectivity Establishment (ICE): A Protocol for Network Address Translator (NAT) Traversal for Offer/Answer Protocols", IETF Trust (Apr. 2010), Retrieved from: http://www.rfc-editor.org/rfc/rfc5245.txt, Retrieved on: Sep. 12, 2013 (110 pages total).
M. Baugher, et al., "The Secure Real-time Transport Protocol (SRTP)", The Internet Society (Mar. 2004), Retrieved from: http://www.rfc-editor.org/rfc/rfc3711.txt, Retrieved on: Sep. 12, 2013 (53 pages total).
J. Rosenberg, et al., "SIP: Session Initiation Protocol", The Internet Society (Jun. 2002), Retrieved from: http://www.rfc-editor.org/rfc/rfc3261.txt, Retrieved on: Sep. 12, 2013 (252 pages total).
H. Schulzrinne, et al., "RTP: A Transport Protocol for Real-Time Applications", The Internet Society (Jul. 2003), Retrieved from: http://www.rfc-editor.org/rfc/rfc3550.txt, Retrieved on: Sep. 12, 2013 (98 pages total).
Bryan, et al., "SOSIMPLE: A SIP/SIMPLE Based P2P VoIP and IM System," Computer Science Department, College a of William and Mary, Williamsburg, VA, Retrieved from: http://www.enseirb.fr/~kadionik/sip/paper, Retrieved Date: Sep. 16, 2013 (6 pages total).
Rauhala, J., "Universal SIP client for consumer devices," Helsinki University of Technology, Department of Electrical Communications Engineering, Thesis submitted May 13, 2003, Retrieved from: http://scholar.google.com/url?sa=U&q=http://antoine.fressancourt.free.fr/exjobb/BX_Universal, Retrieved Date: Sep. 16, 2013 (64 pages total).
Santos, et al., "Deployment of a Wireless Hybrid and Mobile Network for VoIP Services Based on Open Source Software," Universidade Federal de Campina Grande, Retrieved From: http:/www.inf.int-evry.fr/~olberger/wfs2006/danilo, Retrieved Date: Sep. 16, 2013 (20 pages total).
"International Search Report and Written Opinion Received for PCT Patent Application No. PCT/US2014/068685", Mailed Date: Feb. 11, 2015, 7 Pages.

(56) References Cited

OTHER PUBLICATIONS

"International Search Report and Written Opinion Issued in PCT Patent Application No. PCT/US2015/020848", Mailed Date: Jun. 9, 2015, (11 Pages total).
"Route to Home", Published on: Mar. 10, 2012, Available at: http://www.inovar.com/products/RouteToHome.html (1 page total).
"Smart Call Routing", Retrieved on: Dec. 31, 2013, Available at: http://www.roamware.com/downloads/datasheets/Smart%20Call%20Routing.pdf (2 pages total).
"Roaming Call Optimizer", Published on: Mar. 22, 2011, Available at: http://www.starhome.com/call-optimization.html (1 page total).
"Optimal Call Routing", Retrieved on: Dec. 31, 2013, Available at: http://www.bics.com/content/ocr (2 pages total).
"Mobile Collaboration", Retrieved on: Dec. 31, 2013, Available at: http://www.cisco.com/en/US/docs/voice_ip_comm/cucm/srnd/collab09/mobilapp.htmln (39 pages total).
"International Search Report & Written Opinion Received for PCT Application No. PCT/US2015/023453", Mailed Date: Jun. 22, 2015, (12 Pages total).
"International Preliminary Report on Patentability Issued in PCT Application No. PCT/US2014/068685", Mailed Date: Jun. 26, 2015, (6 Pages total).
"International Search Report and Written Opinion Issued in PCT Application No. PCT/US2015/028679", Mailed Date: Aug. 26, 2015, (11 Pages total).
"International Preliminary Report on Patentability Issued in PCT Application No. PCT/US2014/054633", Mailed Date: Aug. 21, 2015, 6 Pages total.
"Second Written Opinion Issued in PCT Application No. PCT/US2015/020848", Mailed Date : Mar. 30, 2016, (7 Pages total).
"International Search Report and Written Opinion Issued in PCT Application No. PCT/US2015/056290", Mailed Date: Feb. 1, 2016, (15 Pages total).
"Second Written Opinion Issued in PCT Application No. PCT/US2015/023453", Mailed Date: Mar. 1, 2016, 6 Pages.
"International Preliminary Report on Patentability Issued in PCT Application No. PCT/US2015/39310", Mailed Date: Jun. 2, 2016, (6 Pages total).
International Preliminary Report on Patentability issued in PCT Application No. PCT/US2015/023453, mailed date: Jun. 17, 2016 (10 pages total).
"International Preliminary Report on Patentability Issued in PCT Application No. PCT/US2015/020848", Mailed Date: Jun. 28, 2016, 8 Pages.

\* cited by examiner

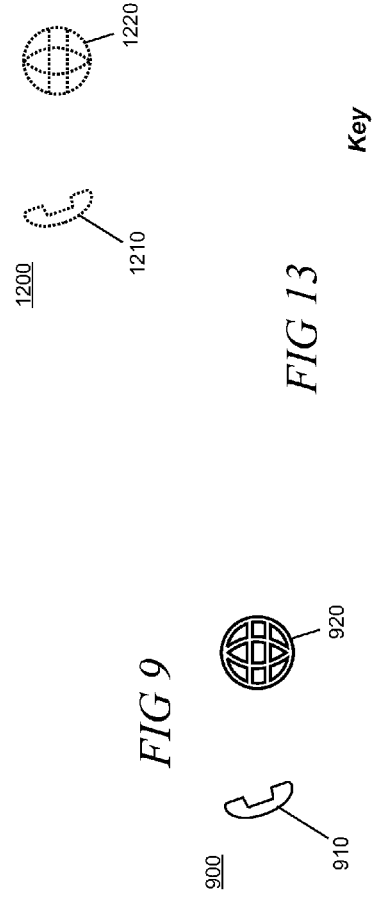
FIG 6
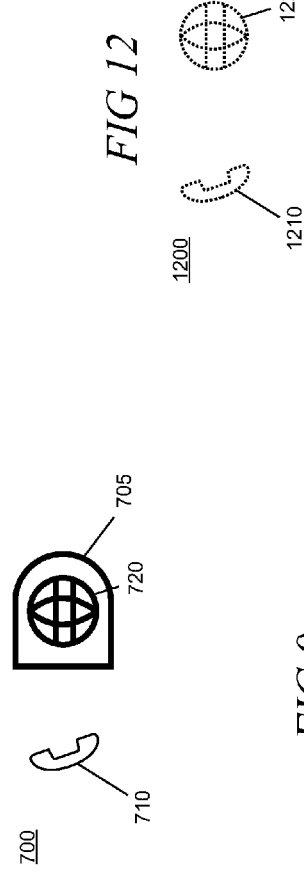
FIG 7
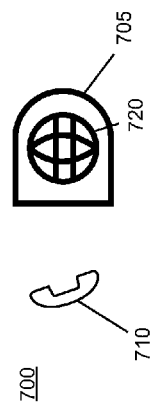
FIG 8
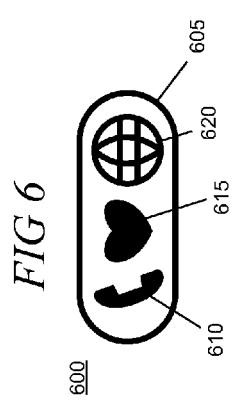
FIG 9
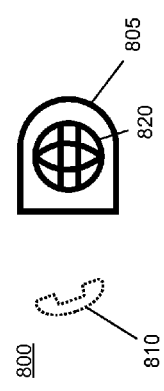
FIG 10
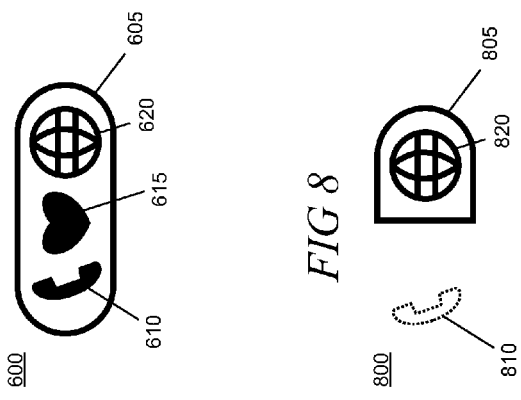
FIG 11
FIG 12
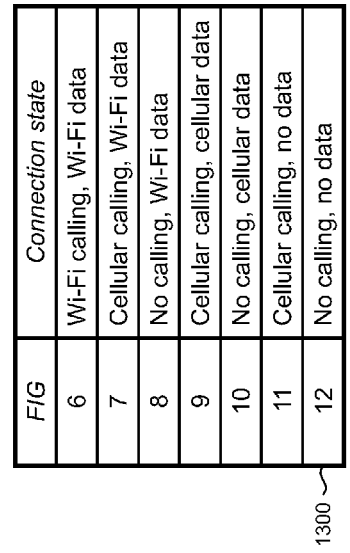
FIG 13
| FIG | Connection state |
|---|---|
| 6 | Wi-Fi calling, Wi-Fi data |
| 7 | Cellular calling, Wi-Fi data |
| 8 | No calling, Wi-Fi data |
| 9 | Cellular calling, cellular data |
| 10 | No calling, cellular data |
| 11 | Cellular calling, no data |
| 12 | No calling, no data |
1300

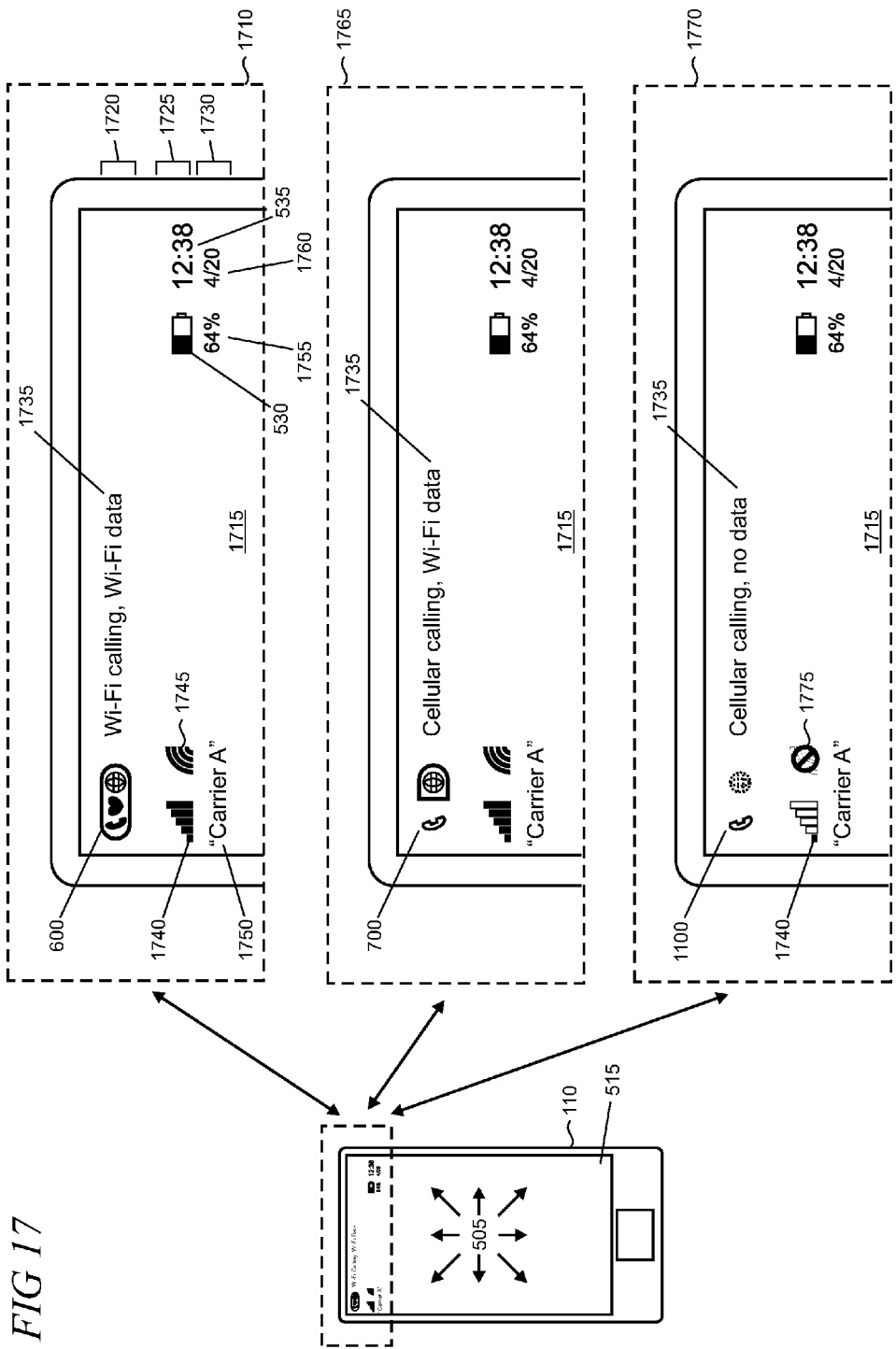

HYBRID TELECOMMUNICATIONS NETWORK CONNECTION INDICATOR

BACKGROUND

Conventional mobile devices may use a cellular network primarily for calling and texting, and a Wi-Fi network (under IEEE 802.11) to access data, for example, when accessing the Internet and consuming media such as music and video. Mobile devices typically express connectivity to these networks with graphics such as cellular bars and Wi-Fi glyphs. In addition, the mobile devices often display glyphs for the various network types and speeds such as LTE (Long Term Evolution), 3G (Third generation of mobile communications technology under the International Mobile Telecommunications-2000 (IMT-2000)), 4G (Fourth generation under IMT-2000), EDGE (Enhanced Data rates for GSM Evolution), etc. The user typically needs to read all of these graphics in combination when assessing the potential quality of calls and Internet access. Accordingly, while such conventional mobile devices can often provide satisfactory performance, opportunities exist to make them more effective with more comprehensive features and benefits to users.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A mobile device having capabilities to access connections to cellular and Wi-Fi portions of a hybrid telecommunications network is configured to display a variety of different icons that graphically indicate a current connection status for both data usage and voice calling on a graphical user interface (GUI). A user can put the GUI into an expanded state to show additional information about the connection status including textual descriptions of icons to instruct the user as to the specific meaning of a given icon. The textual descriptions enable an association between the iconography and the connection state to be established for the user. The icons can then quickly and effectively convey connection state to the user in a comprehensive manner while efficiently using the available display space on the device.

In various illustrative examples, the icons are displayed in an area of the GUI on the mobile device referred to as the system tray along with other elements such as date/time, battery charge status, etc. The user can interact with the touchscreen on the device, or manipulate other controls (e.g., using voice command and gesture recognition systems installed on the mobile device, and the like) to place the system tray into an expanded state to show additional information including a textual description of the icon that represents the current connection state and other information such as cellular and Wi-Fi signal strength, and mobile operator identification. The different connection states illustratively include those that support: i) Wi-Fi calling and Wi-Fi data access; ii) Cellular calling and Wi-Fi data access; iii) No calling and Wi-Fi data access; iv) Cellular calling and cellular data access; v) No calling and cellular data access; vi) Cellular calling and no data access; and, vii) No calling and no data access.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIGS. 6-12 show illustrative hybrid telecommunications network connection indicator icons that correspond to various connection states;

FIG. 13 is a key that provides a description of connection state for each indicator icon shown in FIGS. 6-12;

FIG. 17 shows several illustrative examples of the system tray in an expanded form;

Like reference numerals indicate like elements in the drawings. Elements are not drawn to scale unless otherwise indicated.

DETAILED DESCRIPTION

Figure 1:
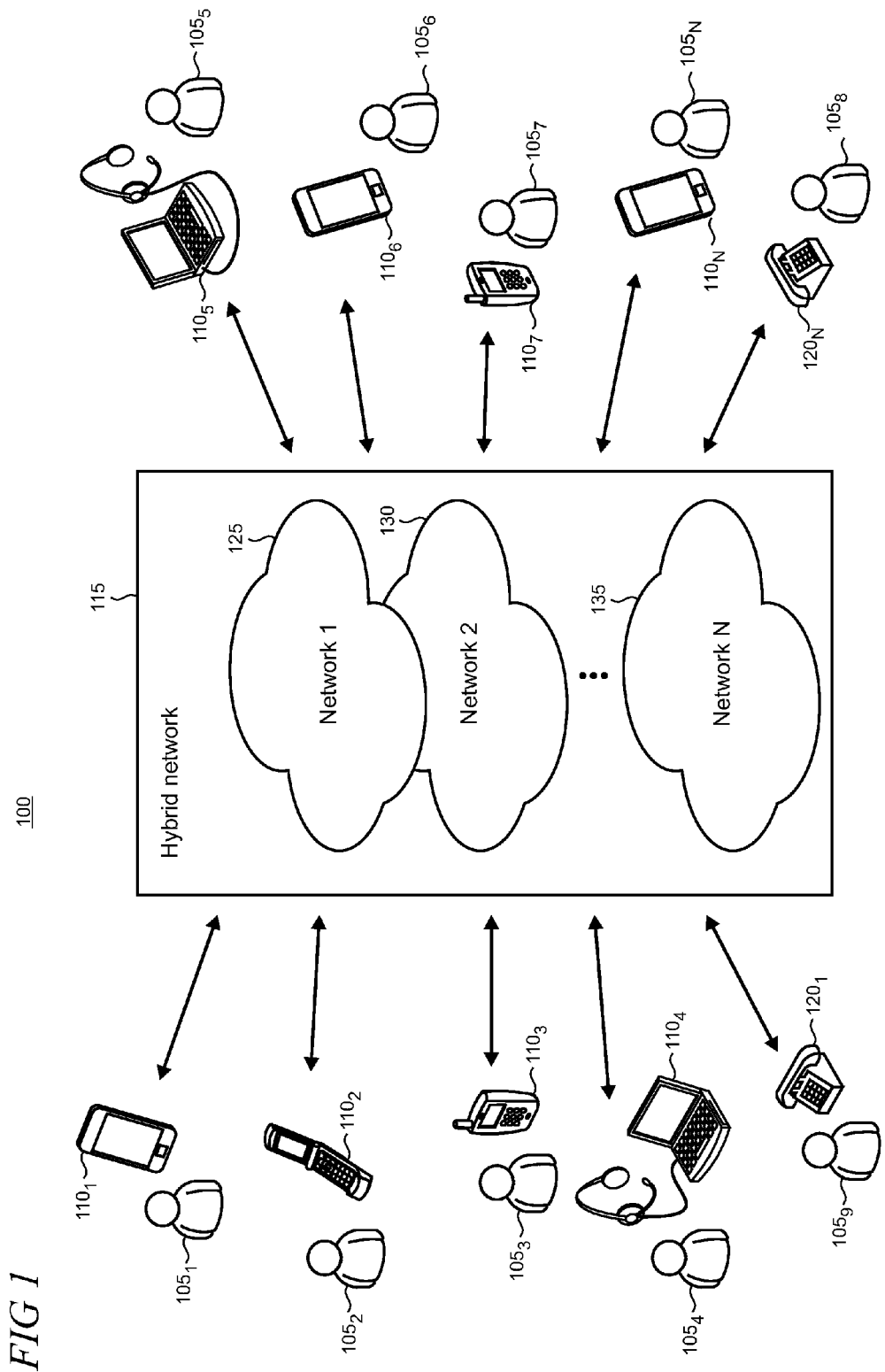
FIG. 1 shows an illustrative telecommunications environment in which devices having telephony capabilities communicate over a hybrid telecommunications network.

FIG. 1 shows an illustrative telecommunications environment 100 in which various users 105 employ respective devices 110 that communicate over a hybrid telecommunications network 115. The devices 110 provide voice telephony capabilities and typically support data-consuming applications such as Internet browsing and multimedia (e.g., music, video, etc.) consumption in addition to various other features. The devices 110 may include, for example, user equipment, mobile phones, cell phones, and smartphones which users often employ to make and receive voice and/or multimedia calls. However, alternative types of electronic devices are also envisioned to be usable within the telecommunications environment 100 so long as they are configured with telephony capabilities and can connect to the hybrid telecommunications network 115, as described in more detail below. Such alternative devices variously include handheld computing devices, PDAs (Personal Digital Assistants), portable media players, wearable computers, navigation devices such as GPS (Global Positioning System) systems, laptop PCs (personal computers) desktop computers, multimedia consoles, gaming systems, or the like. In the discussion that follows, the use of the term "mobile device" is intended to cover all devices that are configured with telephony capabilities and are capable of wireless connectivity to the hybrid telecommunications network 115.

Other types of telephony equipment may also be present in the telecommunications environment 100 such as conventional desktop phones 120 which are operatively coupled to a public switched telephone network (PSTN). Other examples may include equipment that connects to the PSTN using private branch exchanges (PBXs) and equipment coupled to call services that are accessed using telephone numbers. This other telephony equipment may still be utilized in various scenarios involving a hybrid telecommunications network connection indicator, even though it might not implement such functionality itself. For example, a mobile phone 110 may make or receive a call to a desktop phone 120 and employ voice call continuity (as described in more detail below) as the prevailing connection conditions change such as when the mobile device user moves from a car to home during a call.

Figure 2:
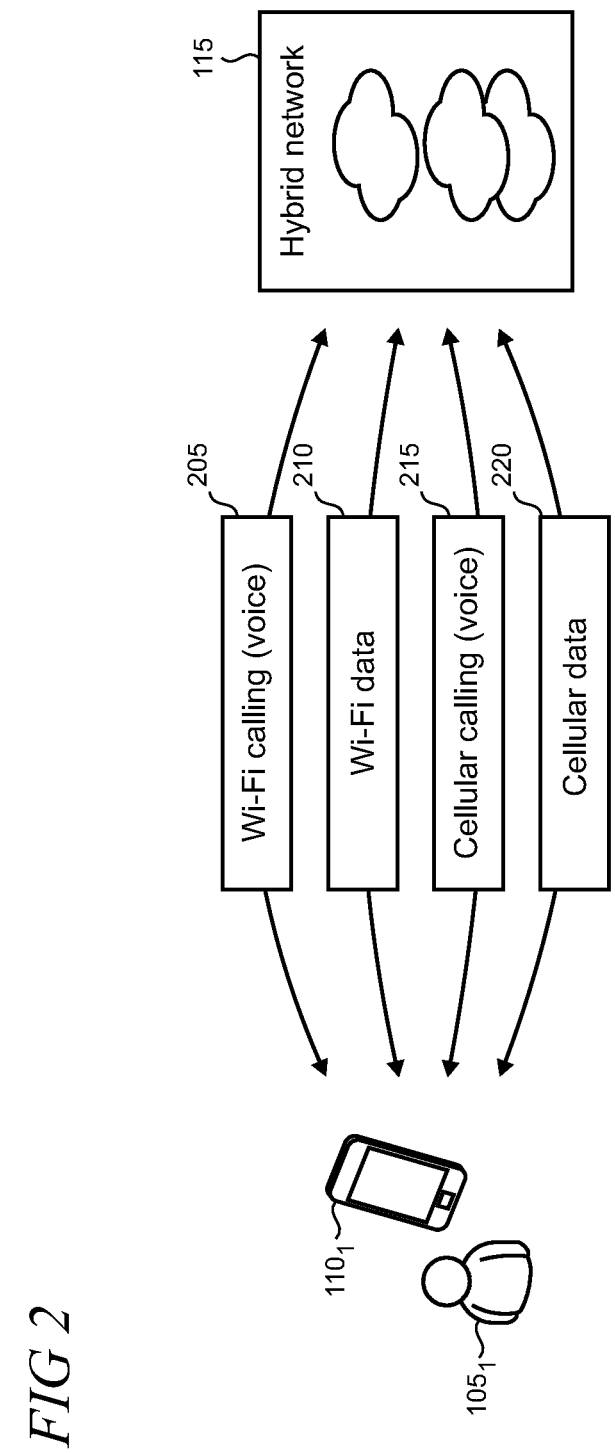
FIG. 2 shows an illustrative example in which a call is carried over multiple types of telecommunications networks.

The hybrid telecommunications network 115 comprises several networks 1, 2 . . . N, identified in FIG. 1 by reference numerals 125, 130, and 135, respectively. Typically, the various networks will be accessed using different types of wireless connections. For example, as shown in FIG. 2, the connection types may illustratively include Wi-Fi calling 205 (i.e., Wi-Fi voice), Wi-Fi data 210, cellular calling 215 (i.e., cellular voice), and cellular data 220. Thus, the networks in the hybrid telecommunications network 115 may include a VoIP network and a mobile operator (MO) network which typically includes an access network portion and a core network portion that provides for switching, routing, transport, and other functionalities. A PSTN wireline network may also be included as part of the hybrid telecommunications network in some implementations, as discussed in more detail below.

Each mobile device 110 will typically have a prearranged association with one or more of the networks underlying the hybrid telecommunications network 115. For example, a user 105 will typically be a subscriber to a cellular telephone service so that the user's mobile device 110 can access a given cellular network as valid and authenticated user equipment. Similarly, the mobile device 110 may include functionality and credentials to access a Wi-Fi network. The mobile devices 110 may also interoperate with a VoIP network and be capable of providing voice call continuity (VCC) across different connection types according to a prearranged association. Such mobile devices are considered "VCC-equipped" and can access the hybrid telecommunications network 115 over the different types of connections.

In some situations, a mobile device may be placed in a dock or cradle that is coupled to the PSTN and thus could employ a wireline connection for a call which is often the least expensive network connection. Typically, the mobile devices 110 use the less expensive Wi-Fi connection whenever it is available and capable of providing a reasonable level of call quality. When Wi-Fi is not available or is inadequate for the voice call, the call may be made over one of the other available network connection options after determining that the selected connection will result in acceptable call quality. Cellular voice is typically the costliest connection alternative but also the most ubiquitous and so it is used to ensure that the user has access to calling services from as wide an area as possible. In the description that follows, the mobile devices 110 are considered to be VCC equipped unless otherwise indicated.

Figure 3:
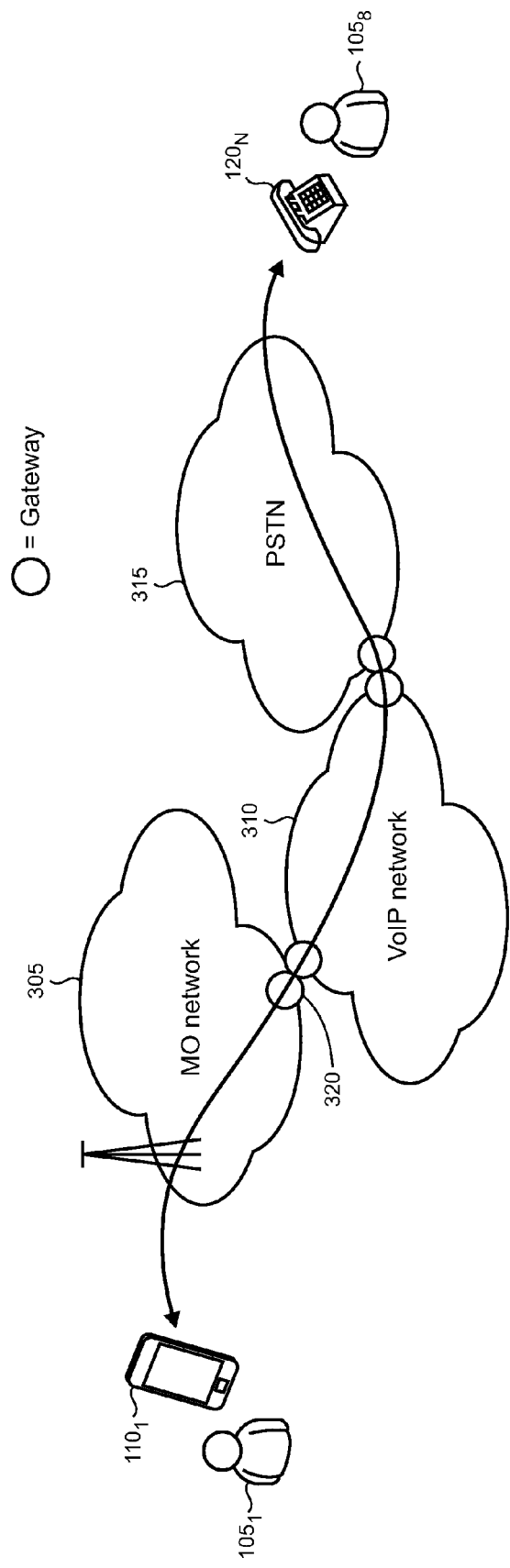
FIG. 3 shows an illustrative example of connection types over which a particular mobile device may access a hybrid telecommunications network.

A characteristic of the hybrid telecommunications network 115 is that two or more of the underlying networks (e.g., networks 125, 130, 135) are considered loosely coupled. That is, in one illustrative example, the VoIP network and the MO network are typically operated independently so that one network cannot exercise significant or substantial control over the operation of the other. However, as shown in FIG. 3, the underlying networks, while loosely coupled, are still interoperable so that calls can traverse an MO network 305, VoIP network 310, and PSTN 315. Such interoperability is commonly facilitated using gateways, as representatively indicated by reference numeral 320. It is becoming increasingly common for significant portions of a given call to be transported over the VoIP network 310 because such networks can often provide very high quality transportation at the lowest cost to the network operators. In such cases, the MO network 305 and the PSTN network 315 essentially function as access networks to the mobile device at each end of the call while the VoIP network 310 performs the bulk of the routing and transport for the call. Other access networks may also be utilized in order for a call to reach the VoIP network 310 including both cellular circuit-switched and packet-switched networks, and Wi-Fi access points (APs) such as public Wi-Fi "hotspots" and those provided by home and office Internet Service Providers (ISPs).

While such hybridization can provide cost-effective and high quality transport, the loose coupling has traditionally presented difficulties for voice call continuity. Voice call continuity functionality is defined here as the maintenance of ongoing voice calls for a device that is capable of placing and receiving voice calls in the face of changes in prevailing connection conditions perhaps due to user mobility or other environmental factors. For example, the connection currently being used, such as Wi-Fi under IEEE (Institute of Electrical and Electronic Engineers) 802.11 could start demonstrating worsening radio signal and/or network congestion conditions, or the user could move to a location where the Wi-Fi connection does not work at all. In addition, other connection options may become available that are lower cost, or provide a better user experience, and therefore either or both the user and network operator may wish to utilize such connection options.

Figure 4:
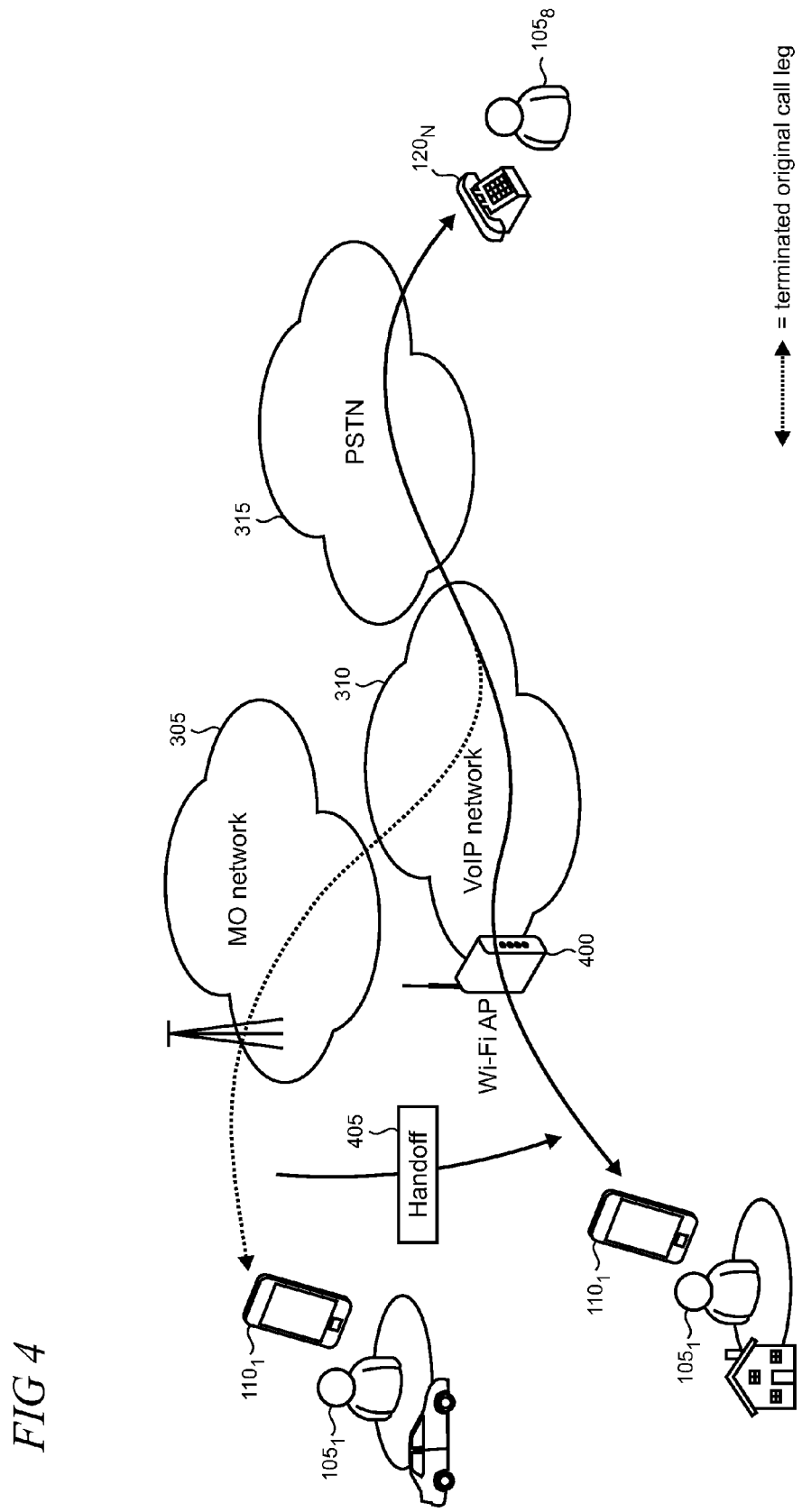
FIG. 4 shows an illustrative example in which a call is handed off between two different networks.

For example, as shown in FIG. 4, a user 105 may be in the car when initiating a call over the MO network 305. When the user 105 returns home, another call leg is then created over a selected connection which in this example is the home Wi-Fi connection via a Wi-Fi AP 400 to the VoIP network 310. The selected connection is associated with the call, preferably while the original call is still ongoing (in what is termed a "make-before-break" handoff). When the new call leg is stable, the original call leg is removed from the call and the handoff 405 to the new connection is complete.

If the handoff is initiated so that both the original and newly selected connections are operative simultaneously then there will be an intermediate state in which both call legs will be running in parallel. Media flows can be directed to and from the mobile device over these parallel connections, until one of the two flows is terminated. Such intermediate state enables the call to be maintained in an uninterrupted manner as perceived by the parties on both ends of the call. During the intermediate state, the mobile device can typically choose to connect to one of the two flows as it deems appropriate.

Figure 5:
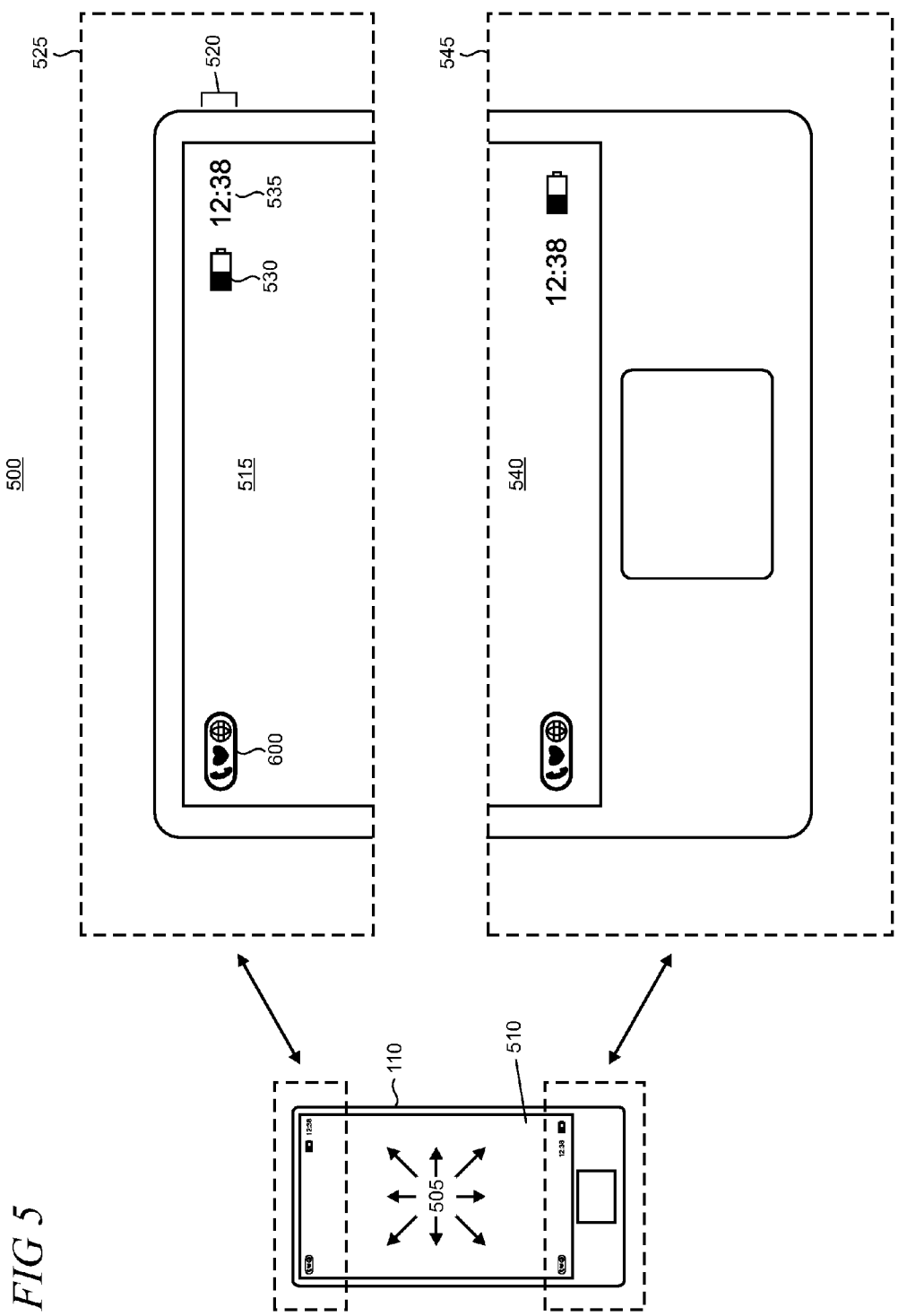
FIG. 5 shows illustrative examples of system trays using the present hybrid telecommunications network connection indicator.

FIG. 5 shows illustrative iconography 500 that may be displayed by a GUI 505 supported by a mobile device 110. In this particular illustrative example, the GUI 505 is implemented using a touch-sensitive display, or "touchscreen" 510 and supports a system tray 515 as shown in FIG. 5 in the enlarged detail view 525. Here, the system tray 515 is implemented using a portion of the GUI towards the top of the mobile device 110 and provides a single row of elements 520. The elements 520 include battery charge state indicator 530, time of day indicator 535, and a hybrid telecommunications network connection indicator 600.

The particular elements shown in the system tray 515 are typically selected as a matter of design choice and thus can vary from what is shown in FIG. 5. It is further noted that the location of the iconography on the GUI, and the respective location of the elements thereof, can vary according to the needs of a particular implementation of the present hybrid telecommunications network connection indicator. For example, in an alternative implementation, a system tray 540 can be configured for display at the bottom of the GUI as shown in the enlarged detail view 545.

Figure 14:
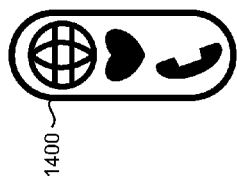
FIG. 14 shows an illustrative icon that is displayed when the mobile device has a landscape orientation.
Figure 15:
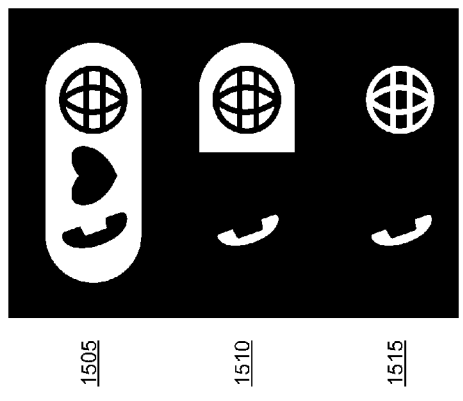
FIG. 15 shows illustrative icons shown in an alternative presentation form.

FIGS. 6-12 show illustrative hybrid telecommunications network connection indicator icons that correspond to various connection states. FIG. 13 shows a key 1300 that indicates the connection state that corresponds to each of the icons shown in FIGS. 6-12. At the onset, it is emphasized that the particular icons shown in FIGS. 6-12 are intended to be illustrative and that other icons of various types, orientations, and designs may be utilized to meet the needs of a particular implementation of a hybrid telecommunications network connection indicator. For example, as shown in FIG. 14, a vertically orientated icon 1400 may be utilized in some cases when the mobile device is used in a landscape orientation. FIG. 15 has icons 1505, 1510, and 1515 shown in an alternative presentation form using white on a black background.

In addition, the specific icons shown in the drawings have been simplified for sake of clarity in exposition given the inherent limitations of black and white line art. Thus, it will be appreciated that icons variously including shading, colors, shadows, transparency, animations, and the like may be utilized in particular instances of a hybrid telecommunications network connection indicator without departing from the spirit and scope of the present description.

Returning to FIGS. 6-12, FIG. 6 shows an illustrative icon 600 that is displayed in the system tray 515 (FIG. 5) to indicate a hybrid telecommunications network connection state in which the mobile device 110 is able to use Wi-Fi connections for both calling and data access. As shown, icon 600 uses a horizontally elongated "pill" shape 605 with rounded ends that encloses three additional graphic elements—a phone 610, a heart 615, and a globe 620. In typical hybrid telecommunications network implementations and usage scenarios, the utilization of a Wi-Fi connection for calling and data access represents the least expensive connection option for the user 105. Accordingly, the heart 615 and pill 605 are used here to signify "goodness", i.e., a connection state that is particularly beneficial to the user 105. The phone 610 and globe 620 are filled-in with black, in this illustrative example, to indicate the availability of the Wi-Fi connection for calling and data access.

FIG. 7 shows an illustrative icon 700 that is displayed in the system tray 515 to indicate a hybrid telecommunications network connection state in which the mobile device 110 is able to use a Wi-Fi connection for data access and a cellular connection for calling. As shown, icon 700 uses a "half-pill" shape 705 behind the globe 720 that is filled-in with black to indicate the availability of the Wi-Fi connection for data access. Here, the half-pill 705 indicates a partially beneficial connection state is available to the user since Wi-Fi (which typically represents the least costly connection option for the user, as discussed above) is available for at least data access. Icon 700 uses a phone 710 that is filled-in with white to indicate the availability of the cellular connection for calling.

FIG. 8 shows an illustrative icon 800 that is displayed in the system tray 515 to indicate a hybrid telecommunications network connection state in which the mobile device 110 is able to use a Wi-Fi connection for data access but calling is unavailable (i.e., calling is not available using either a Wi-Fi connection or a cellular connection to the hybrid telecommunications network). As shown, icon 800 uses a "half-pill" shape 805 behind the globe 820 that is filled-in with black to indicate the availability of the Wi-Fi connection for data access. Icon 800 uses a phone 810 that is "grayed out" (as shown by the dotted line in the drawing) which indicates that a calling functionality is presently unavailable on the mobile device.

FIG. 9 shows an illustrative icon 900 that is displayed in the system tray 515 to indicate a hybrid telecommunications network connection state in which the mobile device 110 is able to use cellular connections for both calling and data access. As shown, icon 900 uses a phone 910 and a globe 920 that are filled-in with white to indicate the availability of cellular connections for calling and data access.

FIG. 10 shows an illustrative icon 1000 that is displayed in the system tray 515 to indicate a hybrid telecommunications network connection state in which the mobile device 110 is able to use a cellular connection for data access but calling is unavailable. As shown, icon 1000 uses a phone 1010 that is "grayed out" (as shown by the dotted line in the drawing) which indicates that calling functionality on the mobile device is presently unavailable. A globe 1020 is filled-in with white to indicate the availability of a cellular connection for data access.

FIG. 11 shows an illustrative icon 1100 that is displayed in the system tray 515 to indicate a hybrid telecommunications network connection state in which the mobile device 110 is able to use a cellular connection for calling but data access is unavailable (i.e., data access is not available using either a Wi-Fi connection or a cellular connection to the hybrid telecommunications network). As shown, icon 1100 uses a globe 1120 that is "grayed out" (as shown by the dotted line in the drawing) which indicates that data access on the mobile device is presently unavailable. A phone 1110 is filled-in with white to indicate the availability of a cellular connection for calling.

FIG. 12 shows an illustrative icon 1200 that is displayed in the system tray 515 to indicate a hybrid telecommunications network connection state in which the mobile device 110 presently has neither calling nor data access functionalities available (i.e., calling and data access are not available using either a Wi-Fi connection or a cellular connection to the hybrid telecommunications network). As shown, icon 1200 uses a phone 1210 and globe 1220 that are "grayed out" (as shown by the dotted lines in the drawing) which indicates that calling and data access functionalities are presently unavailable on the mobile device.

Figure 16:
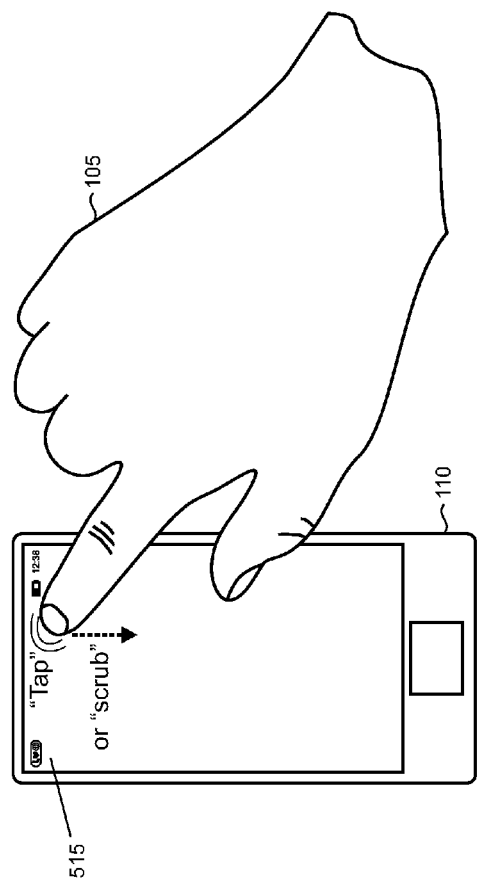
FIG. 16 shows a user interacting with a graphical user interface (GUI) on the mobile device to place the system tray into an expanded form.

FIG. 16 shows the user 105 interacting with the system tray displayed on the GUI on the mobile device 110 to place the system tray into an expanded form. The particular user action utilized to invoke the expanded form of the system tray can vary by implementation. For example, in some cases the GUI may be configured so that the user 105 can interact by touch using various gestures such as tapping the system tray 515 or an area of the GUI near the system tray to invoke the expanded system tray. Alternatively, the GUI can be configured so that the user employs a scrubbing motion by touching a portion of the displayed system tray 515 (or touching the GUI near the displayed system tray) and dragging or pulling the system tray into its expanded form. In some cases the expanded system tray can be invoked by the user issuing voice commands to the mobile device 110 which are interpreted and executed by a suitable voice command recognition system that is resident on the device. The mobile device 110 can also be configured to enable the expanded system tray to be accessed through menu systems and/or other user controls supported by the device. In some implementations, other user gestures that are sensed by the mobile device but which do not involve the user's direct contact with the device may be utilized as inputs.

FIG. 17 shows several illustrative examples of the system tray in an expanded form. As shown in the enlarged detail view 1710, the expanded system tray 1715 is configured to display additional information beyond that provided in the tray's normal/unexpanded configuration. As with the normal/unexpanded system tray 515 shown in FIG. 5, the particular elements shown in the expanded system tray in FIG. 17 may be selected as a matter of design choice and can thus vary from what is shown. In addition, it is noted that the location of the iconography on the mobile device's GUI, and the respective location of the elements thereof, can vary according to the needs of a particular implementation of the present hybrid telecommunications network connection indicator.

In this particular illustrative example, the graphical elements exposed by the expanded system tray are arranged in three rows, respectively indicated by reference numerals 1720, 1725, and 1730. As shown, the top row 1720 of graphical elements includes a hybrid telecommunications network connection icon—here, icon 600—along with a corresponding textual description 1735 for the icon. The second row 1725 of graphical elements retains the battery charge state indicator 530 and time of day indicator 535 from the normal system tray and adds new elements including a cellular connection signal strength indicator 1740 and Wi-Fi connection signal strength indicator 1745. The third row 1730 adds new graphical elements including an identification 1750 of the current MO/cellular carrier (e.g., the cellular carrier can change when the user is roaming away from his or her home cellular network), a numerical representation of the charge state 1755, and date indicator 1760.

As described above, the textual description 1735 enables an association between the iconography and the connection state to the hybrid telecommunications network to be established for the user 105. In some cases, the icon 600 and/or textual description 1735 can be highlighted in some manner, for example, using colors, animation, sounds, music, and other devices/techniques in order to attract the user's attention to further affirm and reinforce the association between the icon and its meaning for the user when the system tray is in its expanded state. In this way, the system tray supplies its own built-in "help" function to provide training to the user as to the meaning of iconography it uses to impart information when it is placed in its expanded state. As the user gains experience and familiarity with the iconography through this built in training tool, a quick glance at the icon in the normal/unexpanded system tray enables the hybrid telecommunications network connection state to be ascertained.

The hybrid telecommunications network connection indicator icons, while occupying only a relatively small space in the system tray (and in the mobile device's GUI overall), can still provide a comprehensive amount of connection state information to the user. Such information can be expected to be of great interest and value to users who typically are looking to employ their mobile devices in ways that maximize their utility while minimizing their operating costs. For example, by knowing when lower cost connections are available, the user can plan calling and data usage to minimize usage of relatively expensive cellular connections. Alternatively, the user may purposely wish to use a cellular connection for calling or data access in cases where Wi-Fi coverage is less robust/reliable or may be expected to become unavailable (e.g., the user is planning to get in the car and move out of Wi-Fi coverage at home).

The enlarged detail view 1765 shows the expanded system tray 1715 for a connection state in which cellular calling is enabled with Wi-Fi data access. In this example, the icon 700 is displayed with the corresponding textual description 1735. The enlarged detail view 1770 shows the expanded system tray 1715 for a connection state in which cellular calling is enabled but Wi-Fi data access is unavailable. In this example, the icon 1100 is displayed with the corresponding textual description 1735. Also, the Wi-Fi signal strength indicator is shown with a prohibition symbol 1775 in this scenario.

Figure 18:
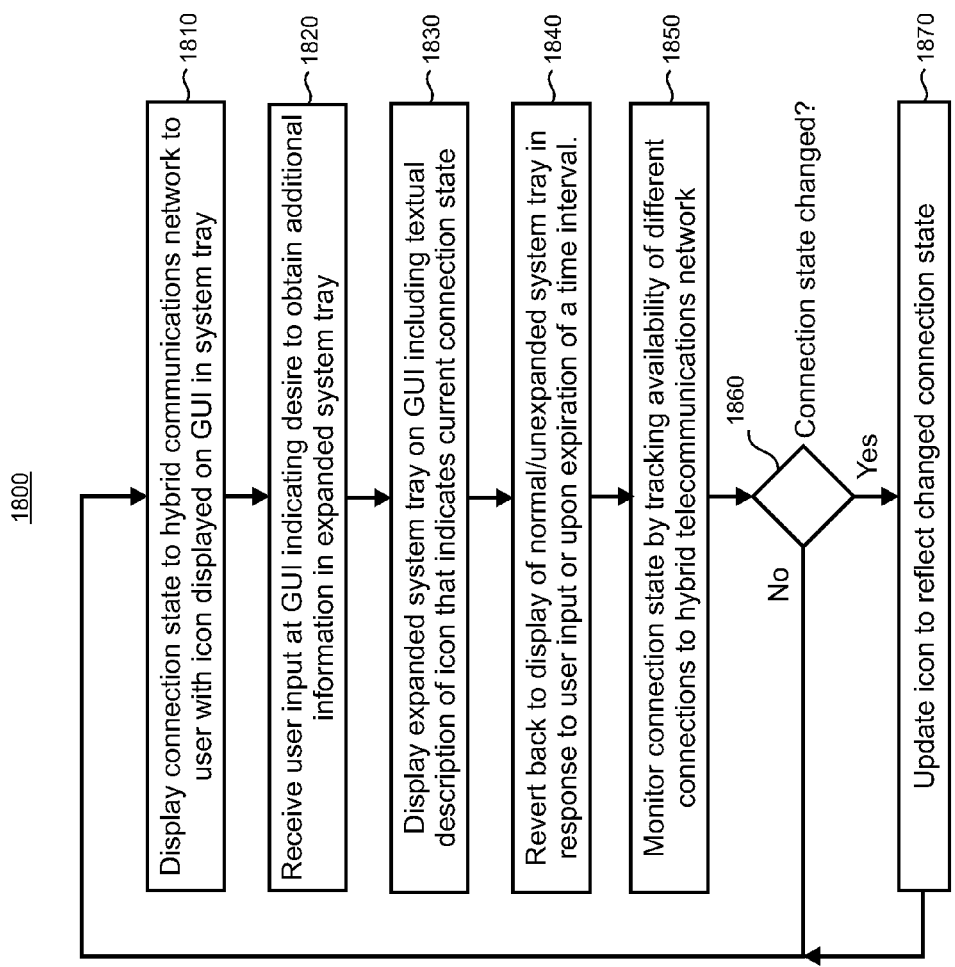
FIG. 18 is a flowchart of an illustrative method for displaying a hybrid telecommunications network connection indicator on a GUI of a mobile device.

FIG. 18 is a flowchart of an illustrative method 1800 for displaying a hybrid telecommunications network connection indicator on the GUI 505 (FIG. 5) of a mobile device 110 (FIG. 1). In step 1810, the state of a connection to the hybrid telecommunications network 115 (FIG. 1) is displayed to the user 105 using the system tray 515 (FIG. 5) displayed on a portion of the GUI 505. In step 1820, user input is received at the GUI (or alternatively at another input system supported on the mobile device such as a gesture or voice command recognition system) that indicates that the user wishes to obtain additional information from an expanded system tray. For example, the user input could be a tap on the mobile device's touchscreen in the area of the displayed system tray 515.

In step 1830, the mobile device displays the expanded system tray 1715 (FIG. 17) on the GUI 505. The expanded system tray 1715 includes a textual description 1735 of the icon (e.g., icons 600-1200 in FIGS. 6-12, respectively) that indicates the current connection state of the mobile device 110. In step 1840, expanded system tray 1715 will revert back to the normal/unexpanded system tray 515 in response to additional user input or upon the expiration of a time interval. For example, the user 105 may tap a portion of the expanded system tray to revert to the normal system tray, or scrub the expanded system tray to collapse it back to its normal/unexpanded state. Alternatively, the user 105 could provide other inputs such as gestures or voice commands to change the expanded system tray back to its normal state. The mobile device typically monitors the connection state by tracking the availability of the various types of connections to the hybrid telecommunications network 115, as shown in step 1850. At decision block 1860, if the connection state to the hybrid telecommunications network 115 changes, then the hybrid telecommunications network connection indicator icon will be updated to reflect the changed connection state in step 1870.

Figure 19:
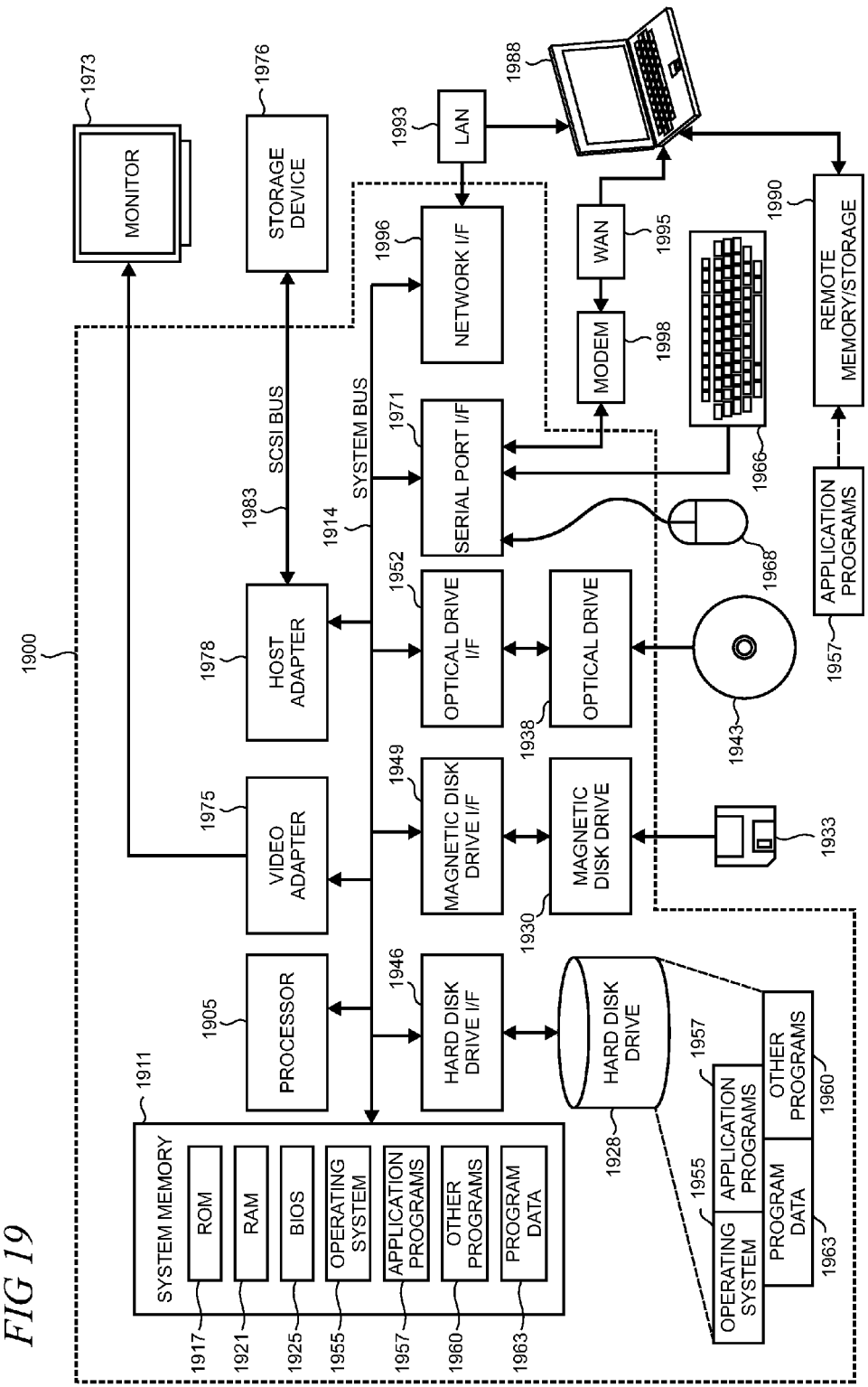
FIG. 19 is a simplified block diagram of an illustrative computer system such as a personal computer (PC) that may be used in part to implement the present hybrid telecommunications network connection indicator.

FIG. 19 is a simplified block diagram of an illustrative computer system 1900 such as a personal computer (PC), client machine, or server with which the hybrid telecommunications network connection indicator may be implemented. Computer system 1900 includes a processor 1905, a system memory 1911, and a system bus 1914 that couples various system components including the system memory 1911 to the processor 1905. The system bus 1914 may be any of several types of bus structures including a memory bus or memory controller, a peripheral bus, or a local bus using any of a variety of bus architectures. The system memory 1911 includes read only memory (ROM) 1917 and random access memory (RAM) 1921. A basic input/output system (BIOS) 1925, containing the basic routines that help to transfer information between elements within the computer system 1900, such as during startup, is stored in ROM 1917. The computer system 1900 may further include a hard disk drive 1928 for reading from and writing to an internally disposed hard disk (not shown), a magnetic disk drive 1930 for reading from or writing to a removable magnetic disk 1933 (e.g., a floppy disk), and an optical disk drive 1938 for reading from or writing to a removable optical disk 1943 such as a CD (compact disc), DVD (digital versatile disc), or other optical media. The hard disk drive 1928, magnetic disk drive 1930, and optical disk drive 1938 are connected to the system bus 1914 by a hard disk drive interface 1946, a magnetic disk drive interface 1949, and an optical drive interface 1952, respectively. The drives and their associated computer-readable storage media provide non-volatile storage of computer-readable instructions, data structures, program modules, and other data for the computer system 1900. Although this illustrative example includes a hard disk, a removable magnetic disk 1933, and a removable optical disk 1943, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present hybrid telecommunications network connection indicator. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk 1928, magnetic disk 1933, optical disk 1943, ROM 1917, or RAM 1921, including an operating system 1955, one or more application programs 1957, other program modules 1960, and program data 1963. A user may enter commands and information into the computer system 1900 through input devices such as a keyboard 1966 and pointing device 1968 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 1905 through a serial port interface 1971 that is coupled to the system bus 1914, but may be connected by other interfaces, such as a parallel port, game port, or universal serial bus (USB). A monitor 1973 or other type of display device is also connected to the system bus 1914 via an interface, such as a video adapter 1975. In addition to the monitor 1973, personal computers typically include other peripheral output devices (not shown), such as speakers and printers. The illustrative example shown in FIG. 19 also includes a host adapter 1978, a Small Computer System Interface (SCSI) bus 1983, and an external storage device 1976 connected to the SCSI bus 1983.

The computer system 1900 is operable in a networked environment using logical connections to one or more remote computers, such as a remote computer 1988. The remote computer 1988 may be selected as another personal computer, a server, a router, a network PC, a peer device, or other common network node, and typically includes many or all of the elements described above relative to the computer system 1900, although only a single representative remote memory/storage device 1990 is shown in FIG. 19. The logical connections depicted in FIG. 19 include a local area network (LAN) 1993 and a wide area network (WAN) 1995. Such networking environments are often deployed, for example, in offices, enterprise-wide computer networks, intranets, and the Internet.

When used in a LAN networking environment, the computer system 1900 is connected to the local area network 1993 through a network interface or adapter 1996. When used in a WAN networking environment, the computer system 1900 typically includes a broadband modem 1998, network gateway, or other means for establishing communications over the wide area network 1995, such as the Internet. The broadband modem 1998, which may be internal or external, is connected to the system bus 1914 via a serial port interface 1971. In a networked environment, program modules related to the computer system 1900, or portions thereof, may be stored in the remote memory storage device 1990. It is noted that the network connections shown in FIG. 19 are illustrative and other means of establishing a communications link between the computers may be used depending on the specific requirements of an application of the present hybrid telecommunications network connection indicator.

Figure 20:
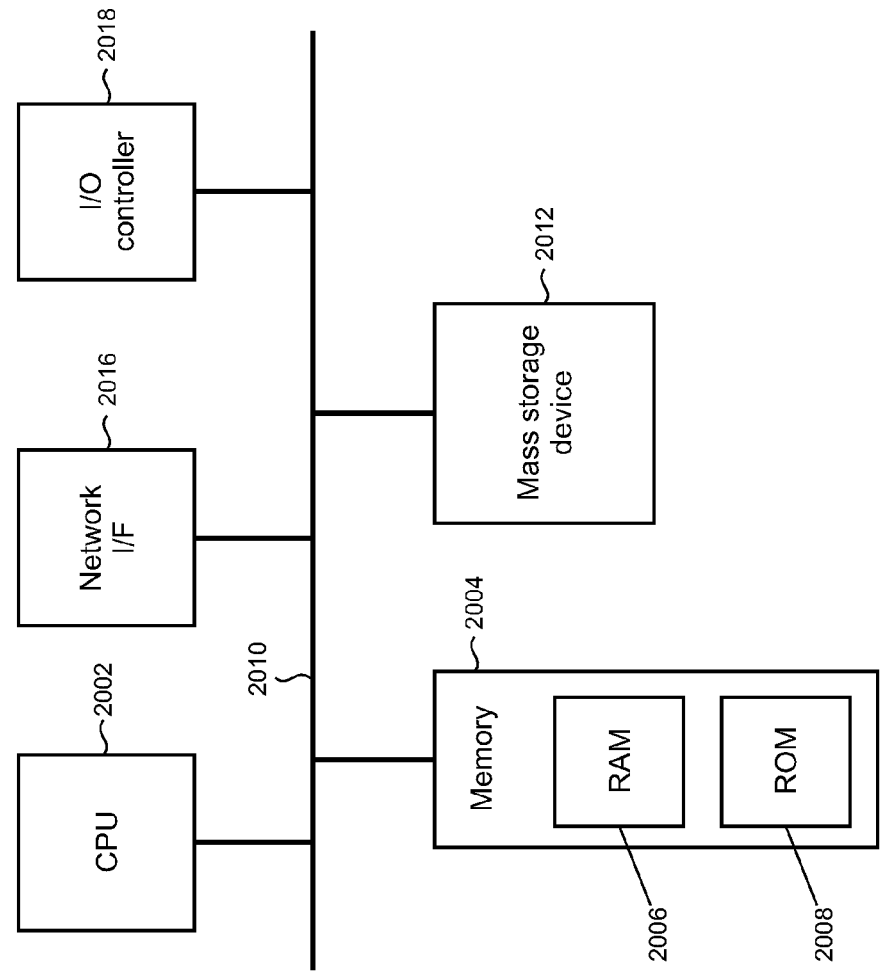
FIG. 20 shows a block diagram of an illustrative device that may be used in part to implement the present hybrid telecommunications network connection indicator.

FIG. 20 shows an illustrative architecture 2000 for a device capable of executing the various components described herein for providing a hybrid telecommunications network connection indicator. Thus, the architecture 2000 illustrated in FIG. 20 shows an architecture that may be adapted for a server computer, mobile phone, a PDA (personal digital assistant), a smartphone, a desktop computer, a netbook computer, a tablet computer, GPS (Global Positioning System) device, gaming console, and/or a laptop computer. The architecture 2000 may be utilized to execute any aspect of the components presented herein.

The architecture 2000 illustrated in FIG. 20 includes a CPU 2002, a system memory 2004, including a RAM 2006 and a ROM 2008, and a system bus 2010 that couples the memory 2004 to the CPU 2002. A basic input/output system containing the basic routines that help to transfer information between elements within the architecture 2000, such as during startup, is stored in the ROM 2008. The architecture 2000 further includes a mass storage device 2012 for storing software code or other computer-executed code that is utilized to implement applications, the file system, and the operating system.

The mass storage device 2012 is connected to the CPU 2002 through a mass storage controller (not shown) connected to the bus 2010. The mass storage device 2012 and its associated computer-readable storage media provide non-volatile storage for the architecture 2000.

Although the description of computer-readable storage media contained herein refers to a mass storage device, such as a hard disk or CD-ROM drive, it should be appreciated by those skilled in the art that computer-readable storage media can be any available storage media that can be accessed by the architecture 2000.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2000.

According to various embodiments, the architecture 2000 may operate in a networked environment using logical connections to remote computers through a network. The architecture 2000 may connect to the network through a network interface unit 2016 connected to the bus 2010. It should be appreciated that the network interface unit 2016 also may be utilized to connect to other types of networks and remote computer systems. The architecture 2000 also may include an input/output controller 2018 for receiving and processing input from a number of other devices, including a keyboard, mouse, or electronic stylus (not shown in FIG. 20). Similarly, the input/output controller 2018 may provide output to a display screen, a printer, or other type of output device (also not shown in FIG. 20).

It should be appreciated that the software components described herein may, when loaded into the CPU 2002 and executed, transform the CPU 2002 and the overall architecture 2000 from a general-purpose computing system into a special-purpose computing system customized to facilitate the functionality presented herein. The CPU 2002 may be constructed from any number of transistors or other discrete circuit elements, which may individually or collectively assume any number of states. More specifically, the CPU 2002 may operate as a finite-state machine, in response to executable instructions contained within the software modules disclosed herein. These computer-executable instructions may transform the CPU 2002 by specifying how the CPU 2002 transitions between states, thereby transforming the transistors or other discrete hardware elements constituting the CPU 2002.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 2000 in order to store and execute the software components presented herein. It also should be appreciated that the architecture 2000 may include other types of computing devices, including handheld computers, embedded computer systems, smartphones, PDAs, and other types of computing devices known to those skilled in the art. It is also contemplated that the architecture 2000 may not include all of the components shown in FIG. 20, may include other components that are not explicitly shown in FIG. 20, or may utilize an architecture completely different from that shown in FIG. 20.

Figure 21:
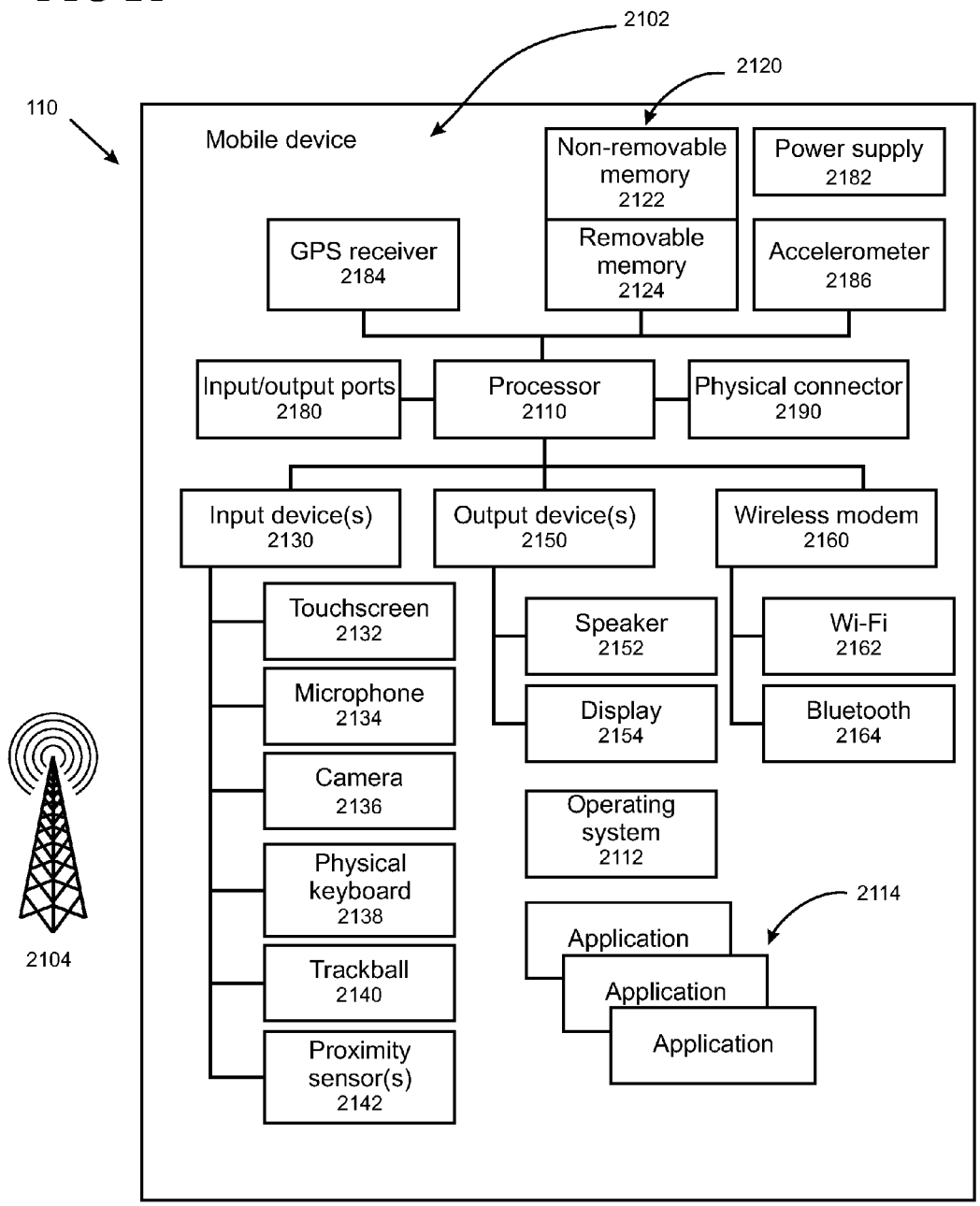
FIG. 21 is a block diagram of an illustrative mobile device.

FIG. 21 is a functional block diagram of an illustrative mobile device 110 such as a mobile phone or smartphone including a variety of optional hardware and software components, shown generally at 2102. Any component 2102 in the mobile device can communicate with any other component, although, for ease of illustration, not all connections are shown. The mobile device can be any of a variety of computing devices (e.g., cell phone, smartphone, handheld computer, Personal Digital Assistant (PDA), etc.) and can allow wireless two-way communications with one or more mobile communication networks 2104, such as a cellular or satellite network.

The illustrated mobile device 110 can include a controller or processor 2110 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2112 can control the allocation and usage of the components 2102, including power states, above-lock states, and below-lock states, and provides support for one or more application programs 2114. The application programs can include common mobile computing applications (e.g., image-capture applications, email applications, calendars, contact managers, web browsers, messaging applications), or any other computing application.

The illustrated mobile device 110 can include memory 2120. Memory 2120 can include non-removable memory 2122 and/or removable memory 2124. The non-removable memory 2122 can include RAM, ROM, Flash memory, a hard disk, or other well-known memory storage technologies. The removable memory 2124 can include Flash memory or a Subscriber Identity Module (SIM) card, which is well known in GSM (Global System for Mobile communications) systems, or other well-known memory storage technologies, such as "smart cards." The memory 2120 can be used for storing data and/or code for running the operating system 2112 and the application programs 2114. Example data can include web pages, text, images, sound files, video data, or other data sets to be sent to and/or received from one or more network servers or other devices via one or more wired or wireless networks.

The memory 2120 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the mobile device 110.

The memory 2120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 110 can support one or more input devices 2130; such as a touch screen 2132; microphone 2134 for implementation of voice input for voice recognition, voice commands and the like; camera 2136; physical keyboard 2138; trackball 2140; and/or proximity sensor 2142; and one or more output devices 2150, such as a speaker 2152 and one or more displays 2154. Other input devices (not shown) using gesture recognition may also be utilized in some cases. Other possible output devices (not shown) can include piezoelectric or haptic output devices. Some devices can serve more than one input/output function. For example, touchscreen 2132 and display 2154 can be combined into a single input/output device.

A wireless modem 2160 can be coupled to an antenna (not shown) and can support two-way communications between the processor 2110 and external devices, as is well understood in the art. The modem 2160 is shown generically and can include a cellular modem for communicating with the mobile communication network 2104 and/or other radio-based modems (e.g., Bluetooth 2164 or Wi-Fi 2162). The wireless modem 2160 is typically configured for communication with one or more cellular networks, such as a GSM network for data and voice communications within a single cellular network, between cellular networks, or between the mobile device and a public switched telephone network (PSTN).

The mobile device can further include at least one input/output port 2180, a power supply 2182, a satellite navigation system receiver 2184, such as a Global Positioning System (GPS) receiver, an accelerometer 2186, a gyroscope (not shown), and/or a physical connector 2190, which can be a USB port, IEEE 1394 (FireWire) port, and/or an RS-232 port. The illustrated components 2102 are not required or all-inclusive, as any components can be deleted and other components can be added.

Based on the foregoing, it should be appreciated that technologies for a hybrid telecommunications network connection indicator have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A mobile device having connectivity to a hybrid telecommunications network comprising loosely coupled network portions, the network portions including at least a mobile operator network portion and a VoIP (Voice over Internet Protocol) network portion, the mobile device comprising:

one or more processors;

a display that supports a graphical user interface (GUI); and a memory device storing computer-readable instructions which, when executed by the one or more processors, creates an association for a user of the mobile device between non-language-based iconography and different connection states to the hybrid telecommunications network, comprising displaying a graphical icon on an unexpanded portion of the GUI, the graphical icon being selected from a group of different graphical icons, wherein each of the different graphical icons represents a different connection state and comprises a first graphical representation for voice calling and a second graphical representation for data connectivity, the selected graphical icon indicating a state of a current connection of the mobile device to the hybrid telecommunications network for voice calling and data connectivity, the current state of connection including one of i) Wi-Fi calling and Wi-Fi data access; ii) cellular calling and Wi-Fi data access; iii) no calling and Wi-Fi data access; iv) cellular calling and cellular data access; v) no calling and cellular data access; vi) cellular calling and no data access; or, vii) no calling and no data access, displaying a textual description of the current connection state for the voice calling and the data connectivity on an expanded portion of the GUI, the textual description associating the selected graphical icon with the current connection state for the user, monitoring for changes in the current connection state, displaying a new graphical icon when the connection state changes, displaying a new textual description of the changed connection state for at least one of the voice calling and the data connectivity on the expanded portion of the GUI to associate the new graphical icon with the changed connection state for the user.

2. The mobile device of claim 1 further including displaying the expanded portion of the GUI in response to a user request.

3. The mobile device of claim 2 further including an input device for capturing the user request, the input device including one of touchscreen, voice command recognition system, or non-contact gesture recognition system.

* * * * *